(12) United States Patent
Charbonnel

(10) Patent No.: US 10,605,179 B2
(45) Date of Patent: Mar. 31, 2020

(54) ENGINE MISFIRE MITIGATION

(71) Applicant: Caterpillar Inc., Deerfield, IL (US)

(72) Inventor: Sylvain Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 20 days.

(21) Appl. No.: 15/998,987

(22) Filed: Aug. 20, 2018

(65) Prior Publication Data

US 2020/0056555 A1 Feb. 20, 2020

(51) Int. Cl.
*F02D 35/02* (2006.01)
*G01M 15/08* (2006.01)
*G01M 15/10* (2006.01)
*G01M 15/09* (2006.01)

(52) U.S. Cl.
CPC ........... *F02D 35/023* (2013.01); *G01M 15/08* (2013.01); *G01M 15/09* (2013.01); *G01M 15/102* (2013.01); *F02D 2200/1015* (2013.01); *F02D 2250/38* (2013.01)

(58) Field of Classification Search
CPC ........... F02D 35/023; F02D 2200/1015; F02D 2250/38; G01M 15/08; G01M 15/09; G01M 15/102
USPC ......................................................... 701/102
See application file for complete search history.

(56) References Cited

U.S. PATENT DOCUMENTS

| | | | | |
|---|---|---|---|---|
| 4,750,453 A | * | 6/1988 | Valdespino | F02B 43/10 123/1 A |
| 4,841,765 A | * | 6/1989 | Blanke | F02D 41/1474 73/114.45 |
| 6,067,956 A | * | 5/2000 | Motose | F02D 41/1487 123/305 |
| 6,098,013 A | * | 8/2000 | Mueller | F02D 41/1458 123/198 D |
| 6,868,826 B1 | | 3/2005 | Oono | |
| 8,195,376 B2 | | 6/2012 | Yuzaki et al. | |
| 8,374,772 B2 | | 2/2013 | Taibi et al. | |
| 9,695,786 B2 | | 7/2017 | Ge et al. | |

(Continued)

FOREIGN PATENT DOCUMENTS

| | | |
|---|---|---|
| CN | 103032190 A | 4/2013 |
| DE | 103 24 805 A1 | 12/2004 |

(Continued)

OTHER PUBLICATIONS

Extended European Search Report for Application No. EP19188953, dated Jan. 9, 2020, 11 pages.

*Primary Examiner* — Mahmoud Gimie
(74) *Attorney, Agent, or Firm* — Harrity & Harrity LLP

(57) ABSTRACT

An engine misfire mitigation system is disclosed. The engine misfire mitigation system may include a sensor system; a fuel system to provide fuel to the engine; and an engine control module to: estimate an air pressure of a combustion chamber of the engine based on measurements from the sensor system, determine a probability that a threshold amount of hydrocarbons are present in an exhaust system of the engine based on the air pressure of the combustion chamber, determine that a fuel injection pressure is to be adjusted based on the probability that the threshold amount of hydrocarbons are present in the exhaust system of the engine and the air pressure of the combustion chamber, and cause the fuel system to reduce the fuel injection pressure.

20 Claims, 3 Drawing Sheets

(56) References Cited

U.S. PATENT DOCUMENTS

| | | | |
|---|---|---|---|
| 2005/0235952 A1* | 10/2005 | Kuzuyama | F02D 13/0215 |
| | | | 123/305 |
| 2006/0060162 A1 | 3/2006 | Fukui et al. | |
| 2007/0235009 A1 | 10/2007 | Nakashima et al. | |
| 2008/0300771 A1 | 12/2008 | Sumitani | |
| 2010/0100303 A1 | 4/2010 | Yuzaki et al. | |
| 2017/0159594 A1* | 6/2017 | Roth | F02D 41/1402 |

FOREIGN PATENT DOCUMENTS

| | | |
|---|---|---|
| DE | 102010000337 A1 | 11/2010 |
| DE | 102010060872 A1 | 6/2011 |
| JP | S6045750 A | 3/1985 |
| JP | 2000045820 A | 2/2000 |
| JP | 3083332 B2 | 9/2000 |
| JP | 2001041082 A | 2/2001 |
| JP | 2003155949 A | 5/2003 |
| JP | 2006299925 A | 11/2006 |
| WO | 2012168791 A1 | 12/2012 |

* cited by examiner

ENGINE MISFIRE MITIGATION

TECHNICAL FIELD

The present disclosure relates generally to an internal combustion engine and, more particularly, to engine misfire mitigation.

BACKGROUND

An internal combustion engine (which may be referred to herein individually as an "engine" or collectively as "engines") may be used to convert chemical energy stored in a fuel supply into mechanical energy (e.g., via a driveshaft of the engine). A fuel-oxidizer mixture is received in a variable volume of a combustion chamber of an engine that is defined by a piston translating within a cylinder of the engine. Under operation, expansion of the combustion products within the variable volume causes the piston to move, which may be transferred to an output shaft of the engine.

Engine misfire may occur under certain operating conditions (or due to a particular operating condition) and may involve an engine skipping over one or more processes of a combustion cycle. Engine misfire can generally cause the engine to run rough, jerk, or buck. Further, engine misfire can also cause the engine to run inefficiently. There are several types of engine misfires. Some of the common occurrences of engine misfire include lean misfires and ignition misfires. Lean misfire refers to an engine misfiring because the air-fuel ratio is not properly balanced. Ignition misfires occur when either the spark plug, wire, distributor, or ignition coil fail. A byproduct of engine misfire may be white smoke in the exhaust of the engine. White smoke in the exhaust is caused by unburned hydrocarbons being included in the exhaust. Accordingly, mitigating white smoke can reduce engine misfire.

One attempt to mitigate white smoke is disclosed in Japanese Patent No. JP 2001041082A ("the '082 patent"). Per the '082 patent, a target injection quantity (e.g., of fuel) may be determined on the basis of an operating condition and an injector energization time corresponding to the target injection quantity is set. In the '082 patent, fuel injection is performed in an amount equal to the target injection amount. In addition, in the '082 patent, the common rail pressure is feedback controlled toward a predetermined target value according to the engine operating state.

While the fuel injection process of the '082 patent may utilize a target injection amount and control the common rail pressure, the rail pressure of a combustion chamber of the engine is controlled to be a minimum amount of rail pressure, which may still result in white smoke and/or engine misfire.

The engine misfire mitigation system of the present disclosure solves one or more of the problems set forth above and/or other problems in the art.

SUMMARY

According to some implementations, a method may include identifying an operating condition of an engine; determining a probability that a threshold amount of hydrocarbons are present in an exhaust system of the engine based on the operating condition, wherein the threshold amount of hydrocarbons corresponds to a likelihood that the engine may misfire; determining a fuel injection pressure amount based on the probability that the threshold amount of hydrocarbons are present in the exhaust system; and/or causing fuel to be pressurized to the fuel injection pressure amount to substantially prevent the engine from misfiring, wherein the fuel is in a fuel system that provides fuel to the engine.

According to some implementations, a system may include a sensor system; a fuel system to provide fuel to the engine; and/or an engine control module to: estimate an air pressure of a combustion chamber of the engine based on measurements from the sensor system, determine a probability that a threshold amount of hydrocarbons are present in an exhaust system of the engine based on the air pressure of the combustion chamber, determine that a fuel injection pressure is to be adjusted based on the probability that the threshold amount of hydrocarbons are present in the exhaust system of the engine and the air pressure of the combustion chamber, and/or cause the fuel system to reduce the fuel injection pressure.

According to some implementations, a device may include a memory; and one or more processors to: determine operating conditions of an engine based on an ambient temperature associated with the engine and an air intake pressure of the engine; determine that a threshold amount of hydrocarbons are present in an exhaust system of the engine based on the operating conditions, wherein the threshold amount of hydrocarbons indicates that the engine is at risk of misfiring; determine that a fuel injection pressure is to be reduced based on determining that the threshold amount of hydrocarbons are present in the exhaust system; and cause the fuel injection pressure to be reduced to be based on an air pressure of a combustion chamber of the engine.

DETAILED DESCRIPTION

This disclosure relates to engine misfire mitigation using an engine misfire mitigation system of an engine control module (ECM). The engine misfire mitigation system has universal applicability to any machine utilizing such an engine misfire mitigation system. The term "machine" may refer to any machine that performs an operation associated with an industry such as, for example, mining, construction, farming, transportation, or any other industry that uses machines with internal combustion engines (e.g., gasoline based engines, diesel based engines, and/or the like). As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine and driven from the engine misfire mitigation system, as described herein.

Figure 1:
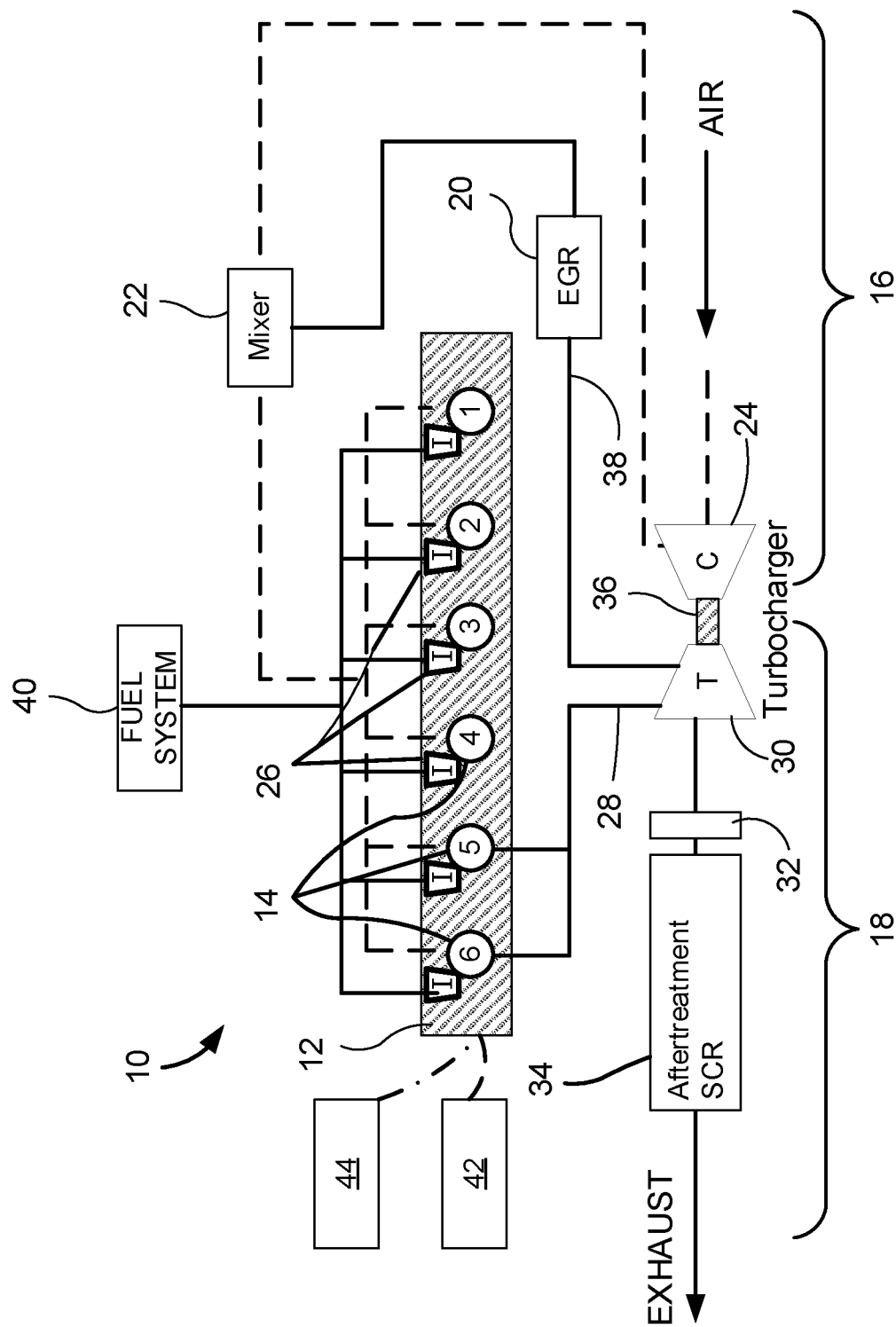
FIG. 1 is a diagram of an example power system described herein.

FIG. 1 is a diagram of an example power system 10 described herein. Power system 10 may be described herein as a compression ignition, internal combustion engine. However, power system 10 may include any other type of internal combustion engine, such as, for example, a spark, laser, or plasma ignition engine. Power system 10 may be fueled by distillate diesel fuel, biodiesel, dimethyl ether, gaseous fuels, such as hydrogen, natural gas, propane, alcohol, ethanol, and/or any combination thereof.

Power system 10, of FIG. 1, includes an engine 12 with a plurality of cylinders 14 (engine 12 of FIG. 1 is shown with six cylinders 14 but may include more or less cylinders 16). A piston assembly may be included within each of cylinders 14 to form a combustion chamber within each cylinder 14. Power system 10 may include any number of combustion chambers and the combustion chambers may be disposed in an in-line configuration, a "V" configuration, or in any other suitable configuration.

Power system 10 may include multiple systems. For example, as shown in the example of FIG. 1, power system 10 may include an air intake or air induction system 16, an exhaust system 18, and an exhaust gas recirculation (EGR) system 20. Air induction system 16 may be configured to direct air, or an air and fuel mixture (e.g., of air and another gas, such as a gas form of the fuel and/or exhaust gas) into power system 10 for subsequent combustion. Exhaust system 18 may exhaust or release byproducts of the combustion to an atmosphere external to power system 10. A recirculation loop of the EGR system 20 may be configured to direct a portion of the exhaust gases from exhaust system 18 back into air induction system 16 for subsequent combustion.

Air induction system 16 may include multiple components that cooperate to condition and introduce compressed air into cylinders 14. For example, air induction system 16 may include a mixer 22, or intake manifold, located downstream of one or more compressors 24. The air induction system 16 feeds variable valve actuators 26 associated with each cylinder 14. In some implementations, air induction system 16 may include a throttle valve, an air cooler, a filtering component, a compressor bypass component, and/or the like. As described herein, characteristics of air induction system 16 may be used to determine a pressure amount of the air being fed into combustion chambers of cylinders 14. For example, an ambient temperature of air received by air induction system 16 (e.g., which may correspond to an ambient temperature of air surrounding a machine using power system 10), a temperature of air in mixer 22, a temperature of mixer 22 (or any other component of air induction system 16), a boost pressure (air intake pressure), and/or the like may be used to determine or estimate air pressure in a combustion chamber of cylinder 14.

Exhaust system 18 may include multiple components that cooperate to condition and direct exhaust from cylinders 14 to the atmosphere. For example, exhaust system 18 may include an exhaust passageway 28, one or more turbines 30 driven by exhaust flowing through exhaust passageway 28, a particulate collection device 32, such as a diesel particular filter (DPF) located downstream of turbine 30, and an exhaust aftertreatment device 34 fluidly connected downstream of particulate collection device 32. In some implementations, exhaust system 18 may include one or more bypass components, an exhaust compression or restriction brake, an attenuation device, additional exhaust treatment devices, and/or the like.

According to some implementations, an amount of hydrocarbons that may be present in exhaust system 18 and/or exhaust from exhaust system 18 may be estimated and/or monitored. Such hydrocarbons may result in white smoke being released into the atmosphere from exhaust system 18. For example, as described herein, certain parameters of power system 10 may be used to determine a likelihood that hydrocarbons are present in the exhaust. According to some implementations, when hydrocarbons are present in exhaust system 18, power system 10 may be controlled to adjust a rail pressure of fuel that is injected into engine 12.

Turbine 30 may be located to receive exhaust leaving power system 10, and may be connected to the one or more compressors 24 of air induction system 16 by way of a common shaft 36 to form a turbocharger. As exhaust gases exiting power system 10 flow through turbine 30 and expand against vanes thereof, turbine 30 may rotate and drive the one or more compressors 24 to pressurize inlet air.

Particulate collection device 32 may be a DPF located downstream of turbine 30 to remove particulate matter from the exhaust flow of power system 10. In some implementations, particulate collection device 32 may include an electrically conductive or non-conductive coarse mesh metal or porous ceramic honeycomb medium. As the exhaust flows through the medium, particulates may be blocked by and trapped in the medium. Over time, the particulates may build up within the medium and, if unaccounted for, could affect engine performance by increasing exhaust backpressure. To minimize backpressure effects on engine performance, the collected particulates may be passively and/or actively removed through a regeneration process. When passively regenerated, the particulates deposited on the filtering medium may chemically react with a catalyst, for example, a base metal oxide, a molten salt, and/or a precious metal that is coated on or otherwise included within particulate collection device 32 to lower the ignition temperature of the particulates. Because particulate collection device 32 may be closely located downstream of engine 12 (e.g., immediately downstream of turbine 30, in one example), the temperatures of the exhaust flow entering particulate collection device 32 may be controlled to be high enough, in combination with the catalyst, to burn away the trapped particulates. When actively regenerated, heat is applied to the particulates deposited on the filtering medium to elevate the temperature thereof to an ignition threshold. In accordance with yet other implementations described herein, an active regeneration device (not shown), such as a fuel-fired burner or an electric heater, may be located proximal (e.g., upstream of) particulate collection device 32 to assist in controlling the regeneration of the particulate collection device 32. A combination of passive and active regeneration may be utilized, if desired.

Exhaust aftertreatment device 34 may receive exhaust from turbine 30 and trap or convert particular constituents in the gas stream. In one example, exhaust aftertreatment device 34 may embody a selective catalytic reduction (SCR) device having a catalyst substrate located downstream from a reductant injector. A gaseous or liquid reductant, most commonly urea or a water/urea mixture may be sprayed or otherwise advanced into the exhaust upstream of catalyst substrate by a reductant injector.

EGR system 20 may redirect gases from exhaust system 18 back into air induction system 16 for subsequent combustion via an EGR conduit 38. EGR is a process whereby exhaust gas from the engine is recirculated back into air induction system 16 for subsequent combustion. The recirculated exhaust gases may reduce the concentration of oxygen within the combustion chambers, and simultaneously lower the maximum combustion temperature therein. The reduced oxygen levels may provide fewer opportunities for chemical reaction with the nitrogen present, and the lower temperature may slow the chemical process that results in the formation of nitrous oxide (NOx). As mentioned above, a cooler may be included to cool the exhaust gases before they are combusted.

Power system 10 of FIG. 1 includes a fuel system 40. Fuel system 40 may include any type of fuel system capable of providing or injecting fuel into combustion chambers of cylinders 14 of engine 12. For example, fuel system 40 may include a fuel pump that is configured to transfer fuel from a fuel tank of a machine or vehicle, associated with power system 10, to the engine 12. In some implementations, the fuel pump may be powered by a motor (e.g., a hydraulic motor, an electric motor, and/or the like) which receives power from engine 12. As described herein, an electronic control module (ECM) 42 may be configured to control the transfer of fuel through fuel system 40. For example, ECM 42 may control timing of opening and closing valves or actuators of fuel system 40, an amount power provided to a fuel pump of fuel system 40 (which may affect a speed of a motor of the fuel pump and/or a speed at which fuel is transferred into and/or through fuel system 40), and/or the like. In some implementations, fuel system 40 may be configured to pressurize fuel to a particular pressure amount. For example, fuel system 40 may receive fuel in a rail (or common rail) that feeds fuel into combustion chambers of cylinders 14 via one or more valves and/or actuators. Fuel system 40 may be configured to pressurize the fuel in the rail based on an amount of fuel that is compressed into the rail. Accordingly, the amount of pressure of the fuel in the rail may be referred to as a rail pressure.

Fuel system 40 may be configured to inject fuel into cylinders 14 of engine 12. In some implementations, ECM 42 may configure fuel system 40 to inject the fuel at a particular pressure and/or according to a particular timing. As described herein, fuel system 40 may be configured to inject fuel into cylinders 14 in a first manner (e.g., with a first timing and/or at a first fuel injection pressure) when a threshold amount of hydrocarbons (e.g., an amount of hydrocarbons causing white smoke) are estimated or determined to be in exhaust of exhaust system 18 (e.g., during a startup of engine 12, while engine 12 is warming up, and/or the like). Additionally, or alternatively, ECM 42 may configure fuel system 40 to inject fuel into cylinders 14 in a second manner (e.g., with a second timing and/or at a second fuel injection pressure) when a threshold amount of hydrocarbons are not estimated or determined to be in the exhaust of exhaust system 18 (e.g., after a startup, after engine 12 is warmed up, and/or the like).

ECM 42, as described herein, provides control of power system 10 in order to mitigate misfire of engine 12 based on engine operating conditions and/or characteristics of power system 10 as indicated by a sensor system 44. ECM 42 is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, ECM 42 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by ECM 42. In some implementations, ECM 42 may include a memory (e.g., a non-transitory computer-readable medium) capable of storing instructions, that when executed, cause the processor to perform one or more processes and/or methods described herein. A computer-readable medium is defined herein as a non-transitory memory device. A memory device includes memory space within a single physical storage device or memory space spread across multiple physical storage devices.

ECM 42 may execute the instructions to perform various control functions and processes to control power system 10 and to automatically control fuel system 40 (e.g., injection timing, fuel injection pressure amount, an/do the like). ECM 42 may include any appropriate type of engine control system configured to perform engine control functions such that power system 10 may operate properly. Further, ECM 42 may also control other systems of a vehicle or machine, such as transmission systems, hydraulics systems, and/or the like.

Sensor system 44 may provide measurements associated with various parameters used by ECM 42 to control power system 10 and/or to mitigate engine misfire in engine 12, as described herein. Sensor system 44 may include physical sensors and/or any appropriate type of control system that generates values of sensing parameters based on a computational model and/or a plurality of measured parameters. As used herein, sensing parameters may refer to those measurement parameters that are directly measured and/or estimated by one or more sensors (e.g., physical sensors, virtual sensors, and/or the like). Example sensors may include temperature sensors, speed sensors, chemical composition sensors (e.g., a NOx emission sensor), pressure sensors, and/or the like. Sensing parameters may also include any output parameters that may be measured indirectly by physical sensors and/or calculated based on readings of physical sensors. Measurements from the sensing parameters, as used herein, may refer to any values relevant to the sensing parameters and indicative of the state of the power system 10. For example, measurements may include machine and environmental parameters, such as compression ratios, turbocharger efficiency, after cooler characteristics, temperature values, pressure values, ambient conditions, fuel rates, engine speeds, and/or the like. Measurements may be included in inputs to be provided to one or more virtual sensors.

Sensor system 44 may be configured to coincide with ECM 42, may be configured as a separate control system, and/or may be configured as a part of other control systems. Further, ECM 42 may implement the sensor system 44 by using computer software, hardware, or a combination of software and hardware. For example, ECM 42 may execute instructions to cause sensors of sensor system 44 to sense and/or generate values of sensing parameters based on a computational model and other parameters.

In operation, computer software instructions may be stored in or loaded to ECM 42. ECM 42 may execute the computer software instructions to perform various control functions and processes to control power system 10 and to automatically adjust engine operational parameters, such as fuel injection timing and fuel injection pressure, one or more operational temperatures, and/or the like. Additionally, or alternatively, ECM 42 may execute computer software instructions to generate and/or operate sensor system 44 to provide engine temperature values, engine pressure values, engine emission values, engine speed values, actuator or valve position values, and/or other parameter values used to monitor and/or control power system 10.

The ECM 42 may also identify, obtain, and/or determine parameters that are associated with conditions (e.g., as sensed by sensor system 44) or settings corresponding to the operations of power system 10, such as engine speed, fuel rate or quantity, injection timing, intake manifold temperature (IMAT), intake manifold pressure (IMAP), intake valve actuation (IVA) end of current, IVA timing, intake throttle valve position, air injection pressure, fuel injection pressure, torque delivered by the engine, total fuel injection quantity, exhaust pressure, number of cylinders 14 firing, oxygen/fuel molar ratio, ambient temperature, ambient pressure (e.g., barometric pressure), mass flow through particulate collection device 32, exhaust backpressure valve position, shot mode, coolant temperature, total induction mass flow in multi-shot mode, dwell (e.g., length of time between shots) in multi-shot mode, and/or the like. Certain parameters may be measured by certain physical sensors, such as a high precision lab grade physical sensor, or created by other control systems.

As indicated above, FIG. 1 is provided as an example. Other examples are possible and may differ from what was described in connection with FIG. 1.

Figure 2:
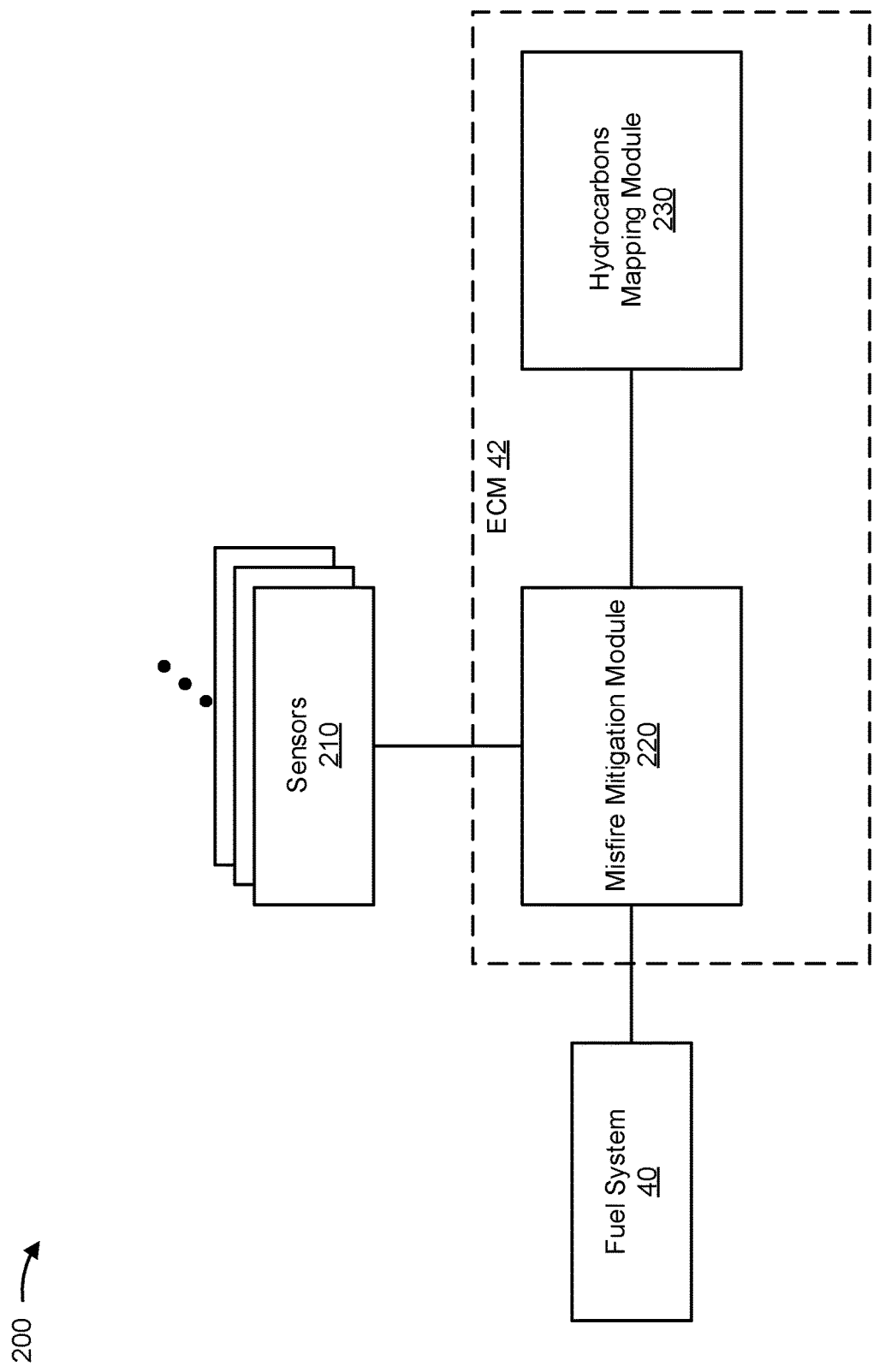
FIG. 2 is a diagram of an example engine misfire mitigation system described herein.

FIG. 2 is a diagram of an example engine misfire mitigation system 200 (referred to herein as "system 200") in which systems and/or methods, described herein, may be implemented. As shown in FIG. 2, system 200 may include, one or more sensors 210 (referred to individually as "sensor 210" and collectively as "sensors 210"), fuel system 40, and ECM 42. As further shown in FIG. 2, ECM 42 may include a misfire mitigation module 220 and a hydrocarbons mapping module 230. Devices of system 200 may interconnect via wired connections, wireless connections, or a combination of wired and wireless connections.

Sensors 210 may include any type of sensor configured to measure operating conditions of power system 10. Sensors 210 may be sensors of sensor system 44, as described herein. For example, the sensors 210 may include temperature sensors (e.g., to detect temperature of air, exhaust, a component, coolant, and/or the like), position sensors (e.g., to detect a position of a valve, an actuator, an engine part (e.g., a piston), and/or the like), speed sensors (e.g., to detect an engine speed, a machine speed, and/or the like), pressure sensors (e.g., to detect a measure of compression of air or fuel in power system 10), emissions sensors (e.g., to detect emission levels of power system 10), and/or the like.

Sensor 210 may be associated with a sensing parameter that may be used in determining a probability that hydrocarbons are present within exhaust of exhaust system 18, as described herein. For example, a value of the sensing parameter for sensor 210 may represent or indicate a measurement of the sensor 210, such as a measured temperature (e.g., an ambient temperature) of a temperature sensor, a measured timing of a valve opening and/or closing by a position sensor, a measured speed of an engine by a speed sensor, a measured position of an actuator by a position sensor, measured emissions by an emissions sensor (e.g., to detect hydrocarbons in exhaust of exhaust system 18), a measured pressure of a pressure sensor, and/or the like.

Misfire mitigation module 220 may include one or more devices configured to perform engine misfire mitigation, as described herein. As shown, misfire mitigation module 220 may be included within and/or implemented by ECM 42. Misfire mitigation module 220 may be configured, via a user interface and/or default settings, to identify a likelihood of a misfire of engine 12 and control fuel system 40 to mitigate the potential for the misfire of engine 12. For example, misfire mitigation module 220 may determine a likelihood of hydrocarbons in exhaust system 18 and adjust a fuel injection pressure and/or timing of the fuel injection to prevent (or mitigate) a misfire in engine 12.

Misfire mitigation module 220, according to some implementations described herein, is configured to identify operating conditions of engine 12. For example, the operating conditions may include an engine speed of engine 12, an ambient temperature of power system 10, air intake pressure in air induction system 16, fuel injection pressure of fuel system 40, and/or the like. Misfire mitigation module 220 may receive and/or obtain measurements from sensors 210 to determine and/or estimate the operating conditions of engine 12.

In some implementations, misfire mitigation module 220 the operating conditions may include an air pressure in a combustion chamber of engine 12. In such cases, the air pressure in the combustion chamber may be measured via one or more sensors 210, may be calculated using measurements from sensors, and/or estimated from a mapping of measurements from sensors to air pressures in the combustion chambers. Accordingly, misfire mitigation module 220 may calculate an air pressure in a combustion chamber of engine 12.

According to some implementations, misfire mitigation module 220 may be configured to determine an amount of hydrocarbons and/or a probability that an amount of hydrocarbons are in exhaust from exhaust system 18. The hydrocarbons may contribute to or be associated with white smoke that is emitted into the atmosphere from exhaust system 18. The hydrocarbons may be unburned hydrocarbons from a combustion in cylinder 14 of engine 12. Therefore, the presence of hydrocarbons may indicate that a misfire occurred in cylinder 14 of engine 12.

According to some implementations, the misfire mitigation module 220 may determine whether an amount of hydrocarbons estimated to be in exhaust system 18 satisfies a threshold (e.g., is greater than or equal to a threshold amount). In such cases, if the amount of hydrocarbons satisfies the threshold, misfire mitigation module 220 may determine that there is a likelihood that a misfire may occur in engine 12. Accordingly, a particular threshold amount of hydrocarbons may correspond to or indicate a likelihood that engine 12 may misfire.

In some implementations, misfire mitigation module 220 may determine a probability that hydrocarbons are present in an exhaust system of the engine based on the operating conditions. For example, certain operating conditions (e.g., relative cold ambient temperatures, relatively low air intake pressure, relatively high fuel injection pressures, and/or the like) may indicate that a misfire is likely to occur in engine 12. Such information may be mapped, maintained (e.g., using hydrocarbons mapping module 230), and/or calculated (e.g., based on one or more measurements or parameters). In such cases, misfire mitigation module 220 may reference the mapping of the current operating conditions of engine 12 to probabilities that hydrocarbons are present in the exhaust system 18. Based on the mapping, misfire mitigation module 220 can determine whether a misfire is to occur and/or whether fuel system 40 is to be controlled or adjusted to prevent and/or mitigate the misfire.

As mentioned above, a threshold amount of hydrocarbons that may be in exhaust system 18 may correspond to an amount of hydrocarbons that causes the engine to misfire at an engine speed of engine 12. Accordingly, the threshold amount may be a variable amount that depends on one or more other operating conditions (e.g., ambient temperature, engine speed, and/or the like). Accordingly, threshold amounts of hydrocarbons may be calculated, stored, and/or maintained by hydrocarbons mapping module 230. In some implementations, misfire mitigation module 220 may determine an engine speed of engine 12, estimate the amount of hydrocarbons present in the exhaust system based on the engine speed, and determine whether the amount of hydrocarbons present in exhaust system 18 is greater than a threshold amount of hydrocarbons indicating a misfire engine 12 at that engine speed.

Accordingly, misfire mitigation module 220 may determine that a probability that an amount (e.g., a threshold amount) of hydrocarbons are present in the exhaust system based on a mapping of operating conditions (e.g., an air pressure of a combustion chamber, an ambient temperature, an air intake pressure, a fuel injection pressure, an engine speed, and/or the like) to probabilities that the threshold amount of hydrocarbons are present in exhaust system 18.

According to some implementations, misfire mitigation module 220 may be configured to determine a fuel injection pressure amount based on the probability that hydrocarbons (or a particular amount of hydrocarbons) are present in exhaust system 18. For example, misfire mitigation module 220 may use a mapping (e.g., a mapping maintained by hydrocarbons mapping module 230) of the probabilities of that hydrocarbons are present in exhaust system 18 to fuel injection pressures that are to be used for corresponding probabilities. In some implementations, the mappings may be based on particular operating conditions (e.g., engine speed, ambient temperature, and/or the like) of engine 12.

In some implementations, misfire mitigation module 220 may determine that a fuel injection pressure is to be adjusted based on the probability that hydrocarbons are present in exhaust system 18 of the engine 12 and/or air pressure of a combustion chamber of engine 12. For example, misfire mitigation module 220 may determine that a current fuel injection pressure is to be reduced based on operating conditions of engine 12. In such a case, at a particular engine speed and/or when fuel system 40 is injecting fuel at a particular fuel injection pressure, misfire mitigation module 220 may determine that the fuel injection pressure is to be reduced. Misfire mitigation module 220 may then determine that the current fuel injection pressure is greater than the fuel injection pressure that should be used under the corresponding operating conditions (e.g., as indicated by a mapping). Accordingly, misfire mitigation module 220 may determine that fuel injection pressure is to be reduced to mitigate the engine misfire.

In some implementations, misfire mitigation module 220 may determine that fuel injection pressure is to be reduced to match and/or be similar to an air pressure in a combustion chamber of engine 21. For example, the operating conditions indicate that an air pressure in a combustion chamber of the engine is less than or equal to the current fuel injection pressure. As such, misfire mitigation module 220 may determine that the air pressure of the combustion chamber is less than a threshold amount corresponding to the current fuel injection pressure, and reduce the fuel injection pressure based on the air pressure of the combustion chamber.

According to some implementations, misfire mitigation module 220 may be configured to cause fuel in fuel system 40 to be pressurized to a particular fuel injection pressure to substantially prevent the engine from misfiring. For example, misfire mitigation module 220 may instruct fuel system 40 to reduce a fuel injection pressure within fuel system 40 by controlling a fuel pump of the fuel system to reduce a pressure of the fuel within fuel system 40 before the fuel is to be released into a combustion chamber of engine 12. In some implementations, misfire mitigation module 220 may be configured to be less than or equal to an air pressure of a combustion chamber of cylinder 14 of engine 12. In some implementations, the air pressure of the combustion chamber may be used as a parameter to determine a maximum fuel injection pressure of the fuel. Additionally, or alternatively, misfire mitigation module 220 may be configured to advance timing of injecting the fuel into the combustion chamber of engine 12.

In some implementations, misfire may be substantially prevented such that misfire is prevented 100% of the time, and, in this case, can be used interchangeably with the term prevented or and/or mitigated. In some implementations, substantially prevent may refer to misfires being prevented 95% or more of the times, 90% or more of the times, and/or the like according to configurations and/or specifications of engine misfire mitigation system 200.

In some implementations, after misfire mitigation module 220 causes the fuel injection pressure to be reduced (e.g., using an air pressure in a combustion chamber of engine 12 as a parameter to determine the fuel injection pressure (e.g., according to a mapping)), misfire mitigation module 220 may determine that hydrocarbons are no longer present in exhaust system 18. For example, operating conditions (e.g., an engine speed, an air intake temperature, an air intake pressure, and/or the like) may indicate that engine 12 is warmed up and/or that there is no longer a likelihood that hydrocarbons are present in exhaust system 18. In such cases, misfire mitigation module 220 may determine that the fuel injection pressure is to be increased and cause the fuel injection pressure to be increased to be greater than the air pressure of the combustion chamber of the engine. For example, misfire mitigation module 220 may instruct fuel system 40 to increase injection fuel pressure of engine 12.

Hydrocarbons mapping module 230 may be any suitable data structure (e.g., a database, a table, an index, a graph, and/or the like) that may store parameters values associated with sensors 210 that are mapped to probabilities of hydrocarbons in exhaust system 18 and/or an amount of hydrocarbons in exhaust system 18. Hydrocarbons mapping module 230 may be updated and/or populated with empirical data found in association with measuring an amount of hydrocarbons in exhaust system 18 under particular operating conditions of engine 12. For example, a mapping may indicate a likelihood of the presence of hydrocarbons and/or an amount of hydrocarbons when engine 12 is running at a particular speed, injecting fuel with a particular timing, and/or injecting fuel at a particular fuel pressure. In some implementations, misfire mitigation module 220 may obtain and/or use mappings maintained by hydrocarbons mapping module 230 to perform engine misfire mitigation, as described herein. For example, mappings in the hydrocarbons mapping module 230 may be used as input values to determine whether engine 12 is likely to experience a misfire and/or has hydrocarbons present in exhaust system 18 to determine whether a fuel injection pressure should be adjusted (e.g., reduced or increased) based on the mapping.

Therefore, hydrocarbons mapping module 230 may maintain and/or include a plurality of tables, mappings, and/or the like that correspond to a variety of measurements associated with sensors 210 and/or settings associated with power system 10 and/or fuel system 40. Accordingly, depending on the environmental characteristics of power system 10, different mappings may be used to perform engine misfire mitigation.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
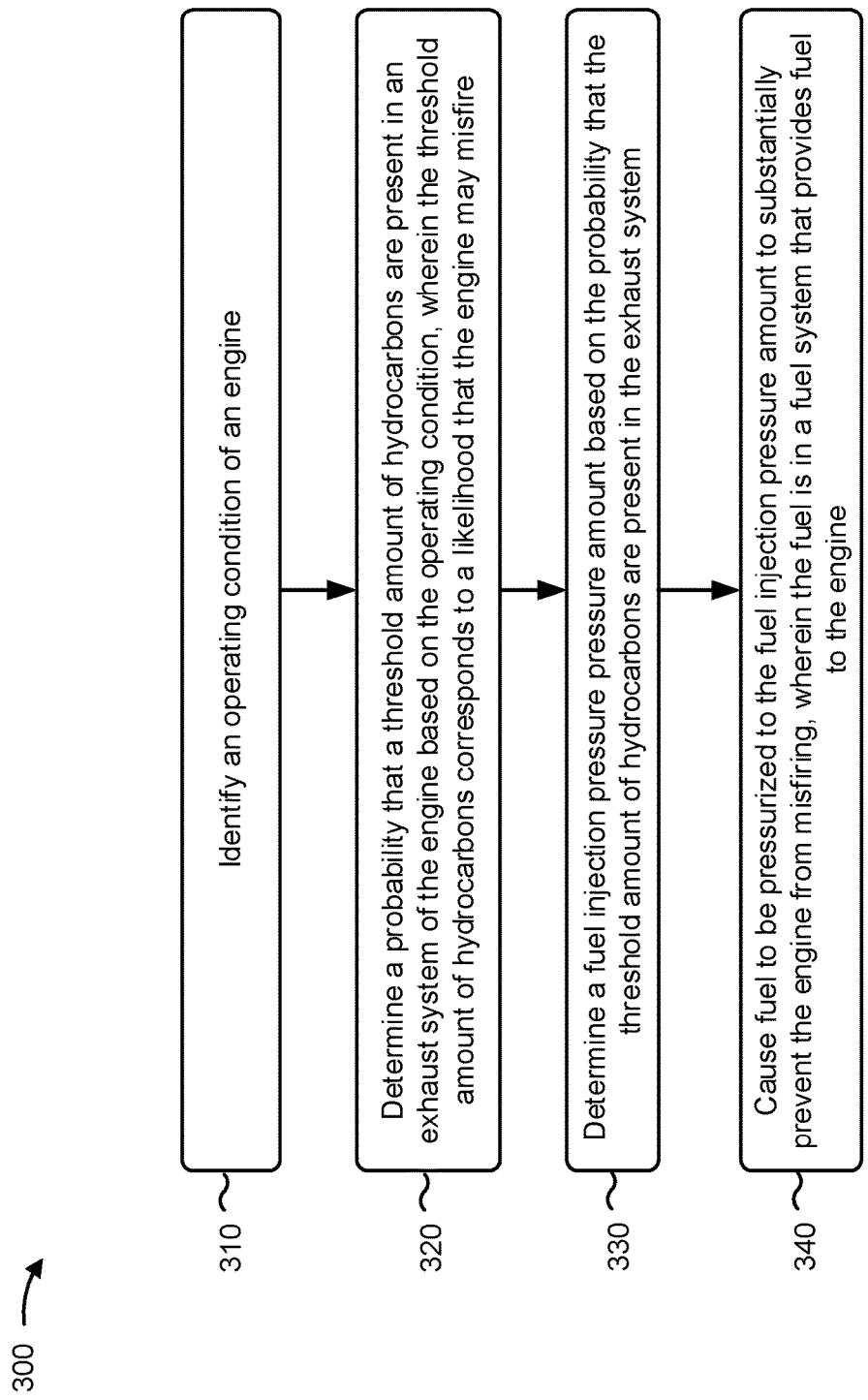
FIG. 3 is a flow chart of an example process associated with engine misfire mitigation.

FIG. 3 is a flow chart of an example process 300 associated with associated with engine misfire mitigation. In some implementations, one or more process blocks of FIG. 3 may be performed by an ECM (e.g., ECM 42 using misfire mitigation module 220 and/or hydrocarbons mapping module 230). In some implementations, one or more process blocks of FIG. 3 may be performed by another device or a group of devices separate from or including the ECM, such as a fuel system (e.g., fuel system 40), sensors (e.g., sensors 210), and/or the like.

As shown in FIG. 3, process 300 may include identifying operating conditions of an engine (block 310). For example, the ECM (e.g., using misfire mitigation module 220) may identify operating conditions of an engine, as described above.

As further shown in FIG. 3, process 300 may include determining a probability that a threshold amount of hydrocarbons are present in an exhaust system of the engine based on the operating conditions, wherein the threshold amount of hydrocarbons corresponds to a likelihood that the engine may misfire (block 320). For example, the ECM (e.g., using misfire mitigation module 220) may determine a probability that a threshold amount of hydrocarbons are present in an exhaust system of the engine based on the operating conditions, as described above. In some implementations, the threshold amount of hydrocarbons corresponds to a likelihood that the engine may misfire.

As further shown in FIG. 3, process 300 may include determining a fuel injection pressure amount based on the probability that the threshold amount of hydrocarbons are present in the exhaust system (block 330). For example, the ECM (e.g., using misfire mitigation module 220 and hydrocarbons mapping module 230) may determine a fuel injection pressure amount based on the probability that the threshold amount of hydrocarbons are present in the exhaust system, as described above.

As further shown in FIG. 3, process 300 may include causing fuel to be pressurized to the fuel injection pressure amount to substantially prevent the engine from misfiring, wherein the fuel is in a fuel system that provides fuel to the engine (block 340). For example, the ECM (e.g., using misfire mitigation module 220) may cause fuel to be pressurized to the fuel injection pressure amount to substantially prevent the engine from misfiring, as described above. In some implementations, the fuel is in a fuel system that provides fuel to the engine.

Process 300 may include additional implementations, such as any single implementation or any combination of implementations described below and/or in connection with one or more other processes described elsewhere herein.

In some implementations, the operating conditions comprise an air pressure in a combustion chamber of the engine. In some implementations, the operating conditions comprise at least one of ambient temperature, a current fuel injection pressure, or an air intake pressure.

In some implementations, the ECM may calculate an air pressure in a combustion chamber of the engine based on the operating conditions. In some implementations, the fuel injection pressure amount is based on the air pressure in the combustion chamber.

In some implementations, the ECM, when determining the probability that the threshold amount of hydrocarbons are present in the exhaust system, may reference a mapping of the operating conditions to probabilities that the threshold amount of hydrocarbons are present in the exhaust system and determine the probability that the threshold amount of hydrocarbons are present in the exhaust system based on the mapping.

In some implementations, the ECM, when determining the fuel injection pressure amount, may determine the fuel injection pressure amount is to be reduced based on the operating conditions. In some implementations, the operating conditions may indicate that an air pressure in a combustion chamber of the engine is based on the fuel injection pressure amount.

In some implementations, the ECM, when causing the fuel to be pressurized to the fuel injection pressure amount comprises, may control a fuel pump of the fuel system to reduce a pressure of the fuel within the fuel system before the fuel is to be released into a combustion chamber of the engine.

Additionally, or alternatively, a process, as described herein, may include estimating an air pressure of a combustion chamber of an engine based on measurements from a sensor system. For example, the ECM (e.g., using misfire mitigation module 220) may estimate an air pressure of a combustion chamber of an engine based on measurements from a sensor system, as described above.

Such a process may include determining a probability that a threshold amount of hydrocarbons are present in an exhaust system of the engine based on the air pressure of the combustion chamber. For example, the ECM (e.g., using misfire mitigation module 220 and hydrocarbons mapping module 230) may determine a probability that a threshold amount of hydrocarbons are present in an exhaust system of the engine based on the air pressure of the combustion chamber, as described above.

Such a process may include determining that a fuel injection pressure is to be adjusted based on the probability that the threshold amount of hydrocarbons are present in the exhaust system of the engine and the air pressure of the combustion chamber. For example, the ECM (e.g., using misfire mitigation module 220) may determine that a fuel injection pressure is to be adjusted based on the probability that the threshold amount of hydrocarbons are present in the exhaust system of the engine and the air pressure of the combustion chamber, as described above.

Such a process may include causing a fuel system to reduce the fuel injection pressure. For example, the ECM (e.g., using misfire mitigation module 220) may cause a fuel system to reduce the fuel injection pressure, as described above.

Such a process may include additional implementations, such as any single implementation or any combination of implementations described below and/or in connection with one or more other processes described herein.

In some implementations, the ECM, when causing the fuel system to reduce the fuel injection pressure, may instruct the fuel system to reduce the fuel injection pressure to be less than or equal to the air pressure of the combustion chamber. In some implementations, the air pressure is estimated based on at least one of an ambient temperature or an air intake pressure measured by the sensor system.

In some implementations, the ECM, when determining that the fuel injection pressure is to be adjusted, may determine that the air pressure of the combustion chamber is less than a threshold amount. In some implementations, the fuel injection pressure is to be adjusted based on the air pressure of the combustion chamber and/or based on determining that the air pressure of the combustion chamber is less than the threshold amount.

In some implementations, the ECM may advance timing of injecting the fuel into the combustion chamber of the engine based on the probability that the threshold amount of hydrocarbons are present in the exhaust system. In some implementations, the ECM may determine that the probability that the threshold amount of hydrocarbons are present in the exhaust system based on a mapping of air pressures to probabilities that the threshold amount of hydrocarbons are present in the exhaust system. In some implementations, the threshold amount of hydrocarbons corresponds to an amount of hydrocarbons that causes the engine to misfire at an engine speed of the engine.

Additionally, or alternatively, a process, as described herein, may include determining operating conditions of an engine based on an ambient temperature associated with the engine and an air intake pressure of the engine. For example, the ECM (e.g., using misfire mitigation module 220) may determine operating conditions of an engine based on an ambient temperature associated with the engine and an air intake pressure of the engine, as described above.

Such a process may include determining that a threshold amount of hydrocarbons are present in an exhaust system of the engine based on the operating conditions, wherein the threshold amount of hydrocarbons indicates that the engine is at risk of misfiring. For example, the ECM (e.g., using misfire mitigation module 220) may determine that a threshold amount of hydrocarbons are present in an exhaust system of the engine based on the operating conditions, as described above. In some implementations, the threshold amount of hydrocarbons indicates that the engine is at risk of misfiring.

Such a process may include determining that a fuel injection pressure is to be reduced based on determining that the threshold amount of hydrocarbons are present in the exhaust system. For example, the ECM (e.g., using misfire mitigation module 220) may determine that a fuel injection pressure is to be reduced based on determining that the threshold amount of hydrocarbons are present in the exhaust system, as described above.

Such a process may include causing the fuel injection pressure to be reduced to be based on an air pressure of a combustion chamber of the engine. For example, the ECM (e.g., using misfire mitigation module 220) may cause the fuel injection pressure to be reduced to be based on an air pressure of a combustion chamber of the engine, as described above.

Such a process may include additional implementations, such as any single implementation or any combination of implementations described below and/or in connection with one or more other processes described herein.

In some implementations, the ECM may determine the air pressure of the combustion chamber based on the operating conditions of the engine. In some implementations, the ECM, when determining that the threshold amount of hydrocarbons are present in the exhaust system, may determine an engine speed of the engine and estimate the amount of hydrocarbons present in the exhaust system based on the engine speed and a mapping of amounts of hydrocarbons in the exhaust system to ambient temperatures and air intake pressures at particular engine speeds of the engine.

In some implementations, the ECM may cause the fuel injection pressure to be reduced by causing a fuel system to reduce a pressure of fuel in the fuel system when the fuel is injected into the combustion chamber. In some implementations, the operating conditions are determined by obtaining measurements from one or more sensors that measure the operating conditions of the engine.

In some implementations, the ECM, after causing the fuel injection pressure to be reduced to less than or equal to the air pressure, may determine that the threshold amount of hydrocarbons are not present in the exhaust system of the engine based on the operating conditions, determine that the fuel injection pressure is to be increased based on determining that the threshold amount of hydrocarbons are not present in the exhaust system, and cause the fuel injection pressure to be increased to be greater than the air pressure of the combustion chamber of the engine.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

In an internal combustion engine (e.g., a diesel engine), misfire can occur under certain conditions (e.g., relatively cold ambient temperatures). In such cases, the engine may produce white smoke (e.g., which includes unburned hydrocarbons) in exhaust from the engine. The white smoke can be harmful to an environment and/or impact one or more components of a power system of the engine (e.g., an aftertreatment system and/or exhaust system). While adjusting timing of when fuel is injected within a combustion chamber of the engine can be used to mitigate white smoke, in some implementations, engine misfires can still occur and white smoke may still be present in the exhaust from the engine.

In some implementations, certain operating conditions may cause an air pressure within a combustion chamber of an engine to be greater than a pressure of the fuel when the fuel is injected into the combustion chamber. As such, the injected fuel, due to having a lower pressure, can be forced to the perimeter of the combustion chamber, where it may not be fully burned during combustion. Accordingly, unburned hydrocarbons from the fuel may be emitted in the exhaust, causing the presence of white smoke in the exhaust. Accordingly, some implementations described herein use a maximum fuel injection pressure to ensure that most, or all of the injected fuel is burned in the combustion chamber during combustion. The maximum fuel injection pressure may be based on or correspond to an estimated or measured pressure of air in the combustion chamber.

As described herein, the pressure of the air in the combustion chamber may be based on operating conditions (e.g., ambient temperature, air intake pressure, and/or the like) of the engine. As such, some implementations, as described herein, estimate an air pressure within the combustion chamber based on operating conditions of the engine. In some implementations, the estimated air pressure may correspond to a maximum fuel injection pressure of fuel when it is to be injected into the combustion chamber.

Accordingly, some implementations described herein may conserve cost associated with operating an engine by decreasing the likelihood that an engine misfires and/or releases white smoke through exhaust of the engine. For example, by ensuring that injected fuel has a same or lower pressure than air in a combustion chamber of the engine, can prevent an engine misfire by allowing most or all of the fuel to be burned within the combustion chamber. As such, avoiding the engine misfires may avoid wasting resources associated with operating an engine. For example, relative to previous techniques, fuel resources can be conserved as the engine may burn the fuel more efficiently, financial resources can be conserved as costs for operating an engine can decrease due to the improved efficiency, hardware resources can be conserved by lessening harmful effects of white smoke on components of the engine, environmental and/or natural resources can be conserved by lessening pollution associated with white smoke, and so on.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A method, comprising:
   identifying, by an engine control module, an operating condition of an engine;
   determining, by the engine control module, a probability that a threshold amount of hydrocarbons are present in an exhaust system of the engine based on the operating condition,
      wherein the threshold amount of hydrocarbons corresponds to a likelihood that the engine may misfire;
   determining, by the engine control module, a fuel injection pressure amount based on the probability that the threshold amount of hydrocarbons are present in the exhaust system; and
   causing, by the engine control module, a fuel to be pressurized to the fuel injection pressure amount to substantially prevent the engine from misfiring,
      wherein the fuel is in a fuel system that provides fuel to the engine.

2. The method of claim 1, wherein the operating condition comprise an air pressure in a combustion chamber of the engine.

3. The method of claim 1, wherein the operating condition comprise at least one of ambient temperature, a current fuel injection pressure, or an air intake pressure.

4. The method of claim 1, further comprising:
   calculating an air pressure in a combustion chamber of the engine based on the operating condition,
      wherein the fuel injection pressure amount is based on the air pressure in the combustion chamber.

5. The method of claim 1, wherein determining the probability that the threshold amount of hydrocarbons are present in the exhaust system comprises:
   referencing a mapping of the operating condition to probabilities that the threshold amount of hydrocarbons are present in the exhaust system; and
   determining the probability that the threshold amount of hydrocarbons are present in the exhaust system based on the mapping.

6. The method of claim 1, wherein determining the fuel injection pressure amount comprises:
   determining that the fuel injection pressure amount is to be reduced based on the operating condition,
      wherein the operating condition indicate that an air pressure in a combustion chamber of the engine is based on the fuel injection pressure amount.

7. The method of claim 1, wherein causing the fuel to be pressurized to the fuel injection pressure amount comprises:
   controlling a fuel pump of the fuel system to reduce a pressure of the fuel within the fuel system before the fuel is to be released into a combustion chamber of the engine.

8. A system comprising:
   a sensor system;
   a fuel system to provide fuel to the engine; and
   an engine control module to:
      estimate an air pressure of a combustion chamber of an engine based on measurements from the sensor system;
      determine a probability that a threshold amount of hydrocarbons are present in an exhaust system of the engine based on the air pressure of the combustion chamber;
      determine that a fuel injection pressure is to be adjusted based on the probability that the threshold amount of hydrocarbons are present in the exhaust system of the engine and the air pressure of the combustion chamber; and
      cause the fuel system to reduce the fuel injection pressure.

9. The system of claim 8, wherein the engine control module, when causing the fuel system to reduce the fuel injection pressure, is to:
   instruct the fuel system to reduce the fuel injection pressure based on the air pressure of the combustion chamber.

10. The system of claim 8, wherein the air pressure is estimated based on at least one of an ambient temperature or an air intake pressure measured by the sensor system.

11. The system of claim 8, wherein the engine control module, when determining that the fuel injection pressure is to be adjusted, is to:
    determine that the air pressure of the combustion chamber is less than a threshold amount,
       wherein the fuel injection pressure is to be adjusted to be less than or equal to the air pressure of the combustion chamber based on determining that the air pressure of the combustion chamber is less than the threshold amount.

12. The system of claim 8, wherein the engine control module is further to:
    advance timing of injecting the fuel into the combustion chamber of the engine based on the probability that the threshold amount of hydrocarbons are present in the exhaust system.

13. The system of claim 8, wherein the engine control module is to determine that the probability that the threshold amount of hydrocarbons are present in the exhaust system based on a mapping of air pressures to probabilities that the threshold amount of hydrocarbons are present in the exhaust system.

14. The system of claim 8, wherein the threshold amount of hydrocarbons corresponds to an amount of hydrocarbons that causes the engine to misfire at an engine speed of the engine.

15. A device comprising:
a memory; and
one or more processors to:
  determine an operating condition of an engine based on an ambient temperature associated with the engine and an air intake pressure of the engine;
  determine that a threshold amount of hydrocarbons are present in an exhaust system of the engine based on the operating condition,
    wherein the threshold amount of hydrocarbons indicates that the engine is at risk of misfiring;
  determine that a fuel injection pressure is to be reduced based on determining that the threshold amount of hydrocarbons are present in the exhaust system; and
  cause the fuel injection pressure to be reduced based on an air pressure of a combustion chamber of the engine.

16. The device of claim 15, wherein the one or more processors are to determine the air pressure of the combustion chamber based on the operating condition of the engine.

17. The device of claim 15, wherein the one or more processors, when determining that the threshold amount of hydrocarbons are present in the exhaust system, are to:
  determine an engine speed of the engine; and
  estimate the amount of hydrocarbons present in the exhaust system based on the engine speed and a mapping of amounts of hydrocarbons in the exhaust system to ambient temperatures and air intake pressures at particular engine speeds of the engine.

18. The device of claim 15, wherein the one or more processors are to cause the fuel injection pressure to be reduced by causing a fuel system to reduce a pressure of fuel in the fuel system when the fuel is injected into the combustion chamber.

19. The device of claim 15, wherein the operating condition are determined by obtaining measurements from one or more sensors that measure the operating condition of the engine.

20. The device of claim 15, wherein the one or more processors, after causing the fuel injection pressure to be reduced based on the air pressure, are to:
  determine that the threshold amount of hydrocarbons are not present in the exhaust system of the engine based on the operating condition;
  determine that the fuel injection pressure is to be increased based on determining that the threshold amount of hydrocarbons are not present in the exhaust system; and
  cause the fuel injection pressure to be increased to be greater than the air pressure of the combustion chamber of the engine.

* * * * *